United States Patent [19]

Hourticolon et al.

[11] 4,426,757
[45] Jan. 24, 1984

[54] WEB GUIDE ROLLER FOR USE AT HIGH SPEEDS AND PROCESS FOR PRODUCING THE SAME

[75] Inventors: Roland Hourticolon, Leichlingen; Gerhard Roth; Hans Frenken, both of Odenthal; Helmut Schäffer, Leverkusen; Günther Koepke, Odenthal, all of Fed. Rep. of Germany

[73] Assignee: Agfa-Gevaert Aktiengesellschaft, Leverkusen, Fed. Rep. of Germany

[21] Appl. No.: 290,738

[22] Filed: Aug. 6, 1981

[30] Foreign Application Priority Data

Aug. 16, 1980 [DE] Fed. Rep. of Germany ....... 3030917

[51] Int. Cl.³ .............................................. B21B 27/02
[52] U.S. Cl. .................................................... 29/121.8
[58] Field of Search ........................................ 29/121.8

[56] References Cited

U.S. PATENT DOCUMENTS

| | | | |
|---|---|---|---|
| 2,114,072 | 4/1938 | Cleveland | 29/121.8 |
| 2,725,640 | 12/1955 | Voigtman | 29/121.8 X |
| 4,189,815 | 2/1980 | Seelenbinder | 29/121.8 |

Primary Examiner—Eugene F. Desmond
Attorney, Agent, or Firm—Connolly and Hutz

[57] ABSTRACT

The invention relates to a web guide roller for a web which is required to be moved at a high speed, having cavities arranged on its surface for receiving the air carried with the moving web, whereby a finely branched network of compression chambers is arranged on the surface between plateau-like smoothly ground and polished areas on which the web lies in contact. Further the invention relates to a process for the production of this web guide rollers for use at high speed.

6 Claims, 4 Drawing Figures

WEB GUIDE ROLLER FOR USE AT HIGH SPEEDS AND PROCESS FOR PRODUCING THE SAME

This invention relates to a web guide roller for a web which is required to be moved at a high speed, having cavities arranged on its surface for receiving the air carried with the moving web, and a process for the production of web guide rollers for use at high speeds.

In processing machines and installations for webs of paper, films or foils, the webs are in many cases guided over a plurality of driven or freely rotating rollers. In these arrangements, it is frequently required that the web should make contact with the rollers around only a small angle of contact and that it should be at a low tension.

In order to avoid damage to the web surface, which is often highly sensitive, as for example in coated photographic paper or film, it is necessary to ensure that the web will be carried over the rollers without slippage, that is to say without relative displacement between the web and the rollers. Driving rollers must be so designed that the surface of the web will be driven and conveyed by the roller without slippage. If the rollers used for guiding the web are idling rollers, then they must be driven by the moving web. Slippage between the roller and the web will cause scratching and abrasion of the surface of the web, even if the surface of the rollers is highly polished.

It is well known that moving webs carry a certain amount of air in the boundary layers which depends on the surface characteristics of the web and the velocity at which it is moving. If the web is in contact with only a small angle of the circumference of the roller, difficulties will arise even at a web velocity of only about 90 m/min due to the air which is carried with the web accumulating upstream of the rollers causing the web to be lifted off the rollers and to glide on an air cushion over the rollers from time to time until the pressure upstream of the rollers has been dissipated. The driving forces which are then transmitted to the roller by the web or to the web by the roller are very small or are equal to zero.

Rollers which are not driven come to a standstill under these conditions or rotate at a considerably reduced speed. If the rollers are driven, the web floats on them so that its movement becomes unstable. The web slips sideways and at times becomes scratched if it makes contact with a moving roller.

Sensitive webs moving at high speeds can no longer be processed if their velocity exceeds 100 m/min and if they are required to be kept at a low tension and to make contact with the rollers around only a small angle thereof.

From U.S. Pat. No. 3,405,855, it is known to solve this problem by using cylindrical rollers which have a plurality of radial grooves extending around their circumference. While the web lies firmly in contact with the remaining surface of the roller, the air carried in the boundary layer of the web flows through the grooves on the underside of the web and leaves the grooves on the opposite side of the roller. Approximately, 10 to 40% of the surface of the roller consists of grooves 0.5 to 2.4 mm in depth and 0.5 to 2.3 mm in width, arranged from 5 to 15 mm apart.

These rollers are, of course, very expensive to manufacture since they require a large number of grooves (200 to 70 grooves/m) to be worked into their surface. To prevent the grooves on the roller leaving a mark on the web, the edges of the grooves must be rounded off, sanded down and polished. A drying installation for photographic materials, for example, requires up to 1000 such rollers and since photographic emulsions are highly sensitive, the edges of the grooves are still liable to leave marks in the form of pressure exposures, on the photographic films.

It is therefore an object of the present invention to provide an inexpensive method of producing web guide rollers and the invention also relates to web guide rollers of the type mentioned above which are capable of guiding and deflecting webs at high velocities without damaging them.

For a web guide roller having the construction described at the beginning of this text, this problem is solved according to the invention by a process for its production in which the surface of a web guide roller of aluminium is sand blasted and then hard chrome-plated and ground and polished in such a manner that a finely branched network of compression chambers is left on the surface of the roller and the adjacent plateau-like areas have a smoothly polished cylindrical surface for guiding and deflecting the web.

Surprisingly, web guide rollers can be produced very simply and economically by this process. It is known that aluminium tubes, and rollers produced from them, can be durably chromium plated without any galvanic pretreatment if their surface has previously been sandblasted. The aluminium surface can be roughened to a degree depending on the granular size of the sand and the velocity with which it impinges on it, and may subsequently be chromium plated. The surface is then ground until it has the required proportion of smooth, plateau-like areas while the remaining, unground surface forms a finely branched network of compression chambers for the air carried along with the rapidly moving web.

The surface quality of the plateau-like areas supporting the web depends on the degree of fineness of the grinding and polishing material, while the depth of the troughs in the finely branched network of compression chambers depends on the sand used for blasting and on the intensity of the grinding process.

In a web guide roller of the structure mentioned above, the problem is solved according to the invention by the arrangement on the surface of the web guide roller of a finely branched network of compression chambers in the form of cavities in which the air carried in the boundary layer of the web becomes compressed by the web when the web embraces the roller, and the web lies in contact with the surface of the roller on the plateau-like smoothly ground and polished surfaces adjacent the compression chambers.

It was not to be foreseen by the man in the art that such fine compression chambers would be sufficient to receive the air carried in the boundary layer of the web while the web is partly wrapped around the roller. It was equally surprising to find that compression of the air in the compression chambers without removal of the air through channels was sufficient to prevent the web from being lifted off the roller even at high web velocities.

The plateau-like, smoothly polished surfaces on the circumference of the web guide roller support the web as it is deflected over the roller without leaving any imprint of edges even on highly sensitive web surfaces. This is due to the fact that the compressed air in the compression chambers supports the web on the roller at the edges of the plateau-like surfaces, and prevents the web from being drawn into the cavities.

The web guide roller is preferably made of aluminium which has been sand blasted on its surface, chromium plated without any galvanic pretreatment and ground down to leave a finely branched network of compression chambers.

The invention is not, of course, limited to the use of aluminium for the production of the web guide rollers but is also applicable to such rollers made of other materials and metals, although lightweight materials are preferably used for the manufacture of web guide rollers moving at high velocities in order to obtain a roller which is light in weight and therefore easily accelerated or braked. Metal rollers are preferred in consideration of the removal of electrostatic charges from the web. Chromium plated rollers are particularly distinguished by their exceptional surface hardness and consequent abrasion resistance.

It is further found to be advantageous if grinding and polishing of the roller on its circumference to produce the plateau-like smooth surfaces are carried out in such a manner that the depth of roughness of the surface is less than 3 $\mu$m, preferably less than 1 $\mu$m.

A depth of roughness of less than 3 $\mu$m or less than 1 $\mu$m provides the web guide roller with a very smooth supporting surface which enables the web to fit firmly onto it. Moreover, a roller having this surface characteristic is easily cleaned.

Grinding and polishing of the surface of the web guide roller are preferably carried out in such a manner that the plateau-like smooth surface for supporting and guiding the web constitutes from 30 to 40% of the total surface area of the roller while the finely branched network of compression chambers cover 60 to 70% of the surface. In this respect, the depth of the troughs of the compression chambers should be from 30 to 80 $\mu$m.

The pressure produced upstream of the roller by the air carried with the web depends on the velocity of the web and the nature of its surface. A rough or structured web surface carries more air in its boundary layer than a smooth web, just as a web moving at high velocity carries more air and increases the air pressure upstream of the roller to a greater extent than a slowly moving web.

It is surprisingly found in practice that the described web guide roller is to a large extent adaptable to particular requirements. If the roller is designed for the maximum web velocity required and the greatest surface roughness of the web, it may equally well be used for any lower values.

The invention will now be described in more detail with reference to the drawings, in which.

Figure 1:
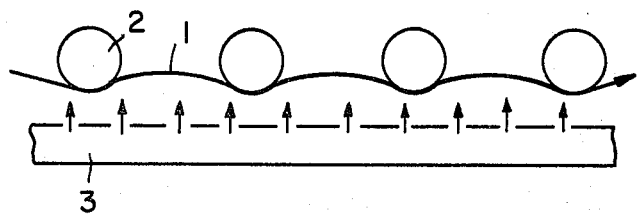
FIG. 1 shows web guide rollers in a flat drying station.

FIG. 1 shows web guide rollers 2 which are in contact with a web 1 around an angle of 2°-8°, depending on the tension in the web. The web 1 is pressed against the guide rollers 2 by a stream of air from a flat drier 3 (see arrows). When conventional web guide rollers are used, an air pressure builds up upstream of each roller 2 and lifts the web 1 off the rollers 2 so that no driving force is exerted on the idling rollers 2. The web 1 glides on an air cushion around the rollers 2 until the air pressure has been dissipated. This causes the movement of the web to be unstable and frequently causes the web to shift sideways. At the same time, the circumferential velocity of the idling rollers 2 is reduced to due to the friction in their bearings so that the rollers must again be accelerated by the web 1. The web 1 then slips on the rollers 2 and is damaged by their surfaces.

FIG. 2 again shows a web 1 which is blown against web guide rollers 4,5 by air streaming from a flat drier 3 (see arrows). The web 1 is at the same time sucked into the gap between the two closely adjacent rollers 4 and 5 by the vacuum in the hollow suction chambers of the rollers, with the result that the angle of contact of the web 1 with the guide rollers is increased.

When conventional web guide rollers are used in the suction chambers 6 and relatively high web velocities of more than about 100 m/min are employed, air pressure again builds up upstream of the web guide rollers 4 causing the web 1 to lift off the first roller 4 and reduce the driving force on the roller 4. Contact between the web and the guide rollers 5 is maintained since the air on the web is removed by suction due to the vacuum between the rollers 4 and 5. Although the arrangement of FIG. 2 avoids the unstable movement of the web, the surface of the web is damaged by the idling rollers 4 intermittently moving at a reduced speed.

Figure 3:
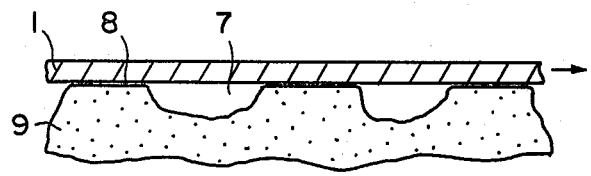
FIG. 3 represents an enlarged section through the surface of a web guide roller with a web lying on it.
Figure 4:
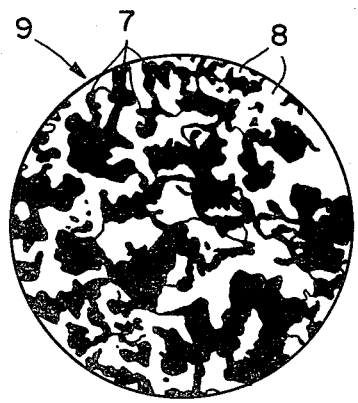
FIG. 4 represents an enlarged view of a web guide roller from above.

If the web guide rollers 9 have a finely branched network of compression chambers 7 in their surface as described above and illustrated in FIGS. 3 and 4, the air carried in the boundary layer of the web 1 is compressed in those compression chambers 7 situated where the web 1 is in contact with the roller 9 and this air is deflected with the web and is discharged from the roller 9 on the side where the web 1 runs off the roller 9. While the web 1 is being deflected by the roller, it is firmly in contact with the plateau-like, smoothly ground and polished surfaces 8 surrounding the compression chambers 7. FIG. 3 represents a radial section through the surface of a web guide roller 9. The compression chambers 7 and plateau-like surfaces 8 on which the web 1 lies are shown greatly enlarged. FIG. 4 is a view from above of a small section on the surface of a web guide roller 9, showing the finely branched network of compression chambers 7 (dotted areas) and the ground, plateau-like surfaces 8.

Manufacture of the web guide rollers described is relatively simple and costs no more than the manufacture of chromium plated metal rollers. Production and testing of the described web guide rollers will now be explained with the aid of an example.

EXAMPLE

Aluminium tubes having an external diameter of 70 mm, a wall thickness of 5 mm and a length of 1780 mm were blasted with glass beads having a diameter of 600 to 800 $\mu$m, using a pressure of 5 bar. The blasted rollers were rotated at 35 revs/min and advanced at the rate of 150 mm/min. The tubes were passed twice through the blasting station. They were then chromium plated in a chrome bath to form a chromium layer 50 to 70 $\mu$m in thickness.

The chromium plated tubes were ground on a fine grinding machine until 40% of the surface was observed to be ground. The ground surfaces of the tubes were then polished to a depth of rougness of 1 μm with a 220 grain. Ball bearings were inserted at each end and the tubular web guide rollers were balanced and mounted on shafts in a flat drying station as illustrated in FIG. 1. The rollers were tested under production conditions for 3 months, using a web velocity of 380 m/min, an angle of contact of the web around the roller of 1.5° and a web tension of 15 kg/m width of web.

The web guide rollers satisfied the requirements in every respect. No relative displacement occurred between the web and the guide rollers. The web showed no signs of instability or lateral shifting. The guide rollers produced no scratches on the sensitive surface of the web and caused no pressure exposures on photographic films.

The guide rollers were not found to be soiled to any significant extent and were easily cleaned.

Figure 2:
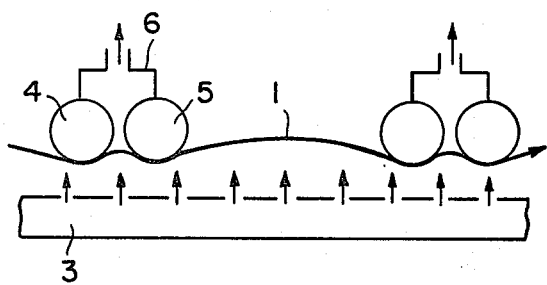
FIG. 2 shows web guide rollers in a drying station with hollow roller suction devices.

A simple flat drying station of FIG. 1 could be used in place of the complicated arrangement of FIG. 2 using hollow roller suction chambers, since the web made firm contact with all the guide rollers.

We claim:

1. A process for the production of cavities arranged on a surface of a metal cylindrical member
   comprising the steps of
   sand-blasting the surface of the cylindrical member, and
   then chrome-plating the sand-blasted surface and
   then grinding and polishing the chrome-plated surface
   to produce a finely branched net-work of compression chambers and troughs with adajacent plateau-like surfaces arranged on the member for receiving air from a moving web supported by the surface of the member,
   said network consisting of 60 to 70% of the member periphery,
   whereby the air carried by the moving web may be passed through the net-work chambers.

2. A web guide for a fast moving web comprising
   a metal cylindrical member which has been surface sand-blasted and then chrome-plated and the chrome-plated surface has been ground and polished,
   a finely branched network of compression chambers and troughs with adjacent plateau-like areas on the member surface to produce a web-supporting circumference of the guide with depressions that can take up a volume of air,
   and said network consisting of 60 to 70% of the member circumference.

3. A member according to claim 2, characterised in that it consists of aluminium which is sand blasted on its surface, chromium plated and ground in such a manner that a finely branched network of compression chambers remains.

4. A web guide roller according to claim 2, characterised in that grinding and polishing of the circumferential surface of the member to produce the plateau-like smooth surfaces are carried out in such a manner that the depth of roughness of the surface is less than 3 μm, preferably less than 1 μm.

5. A web guide roller according to claim 2, characterised in that the plateau like smooth surface for supporting and guiding the web constitutes 30 to 40% of the surface of the member and the finely branched network of compression chambers constitutes 60 to 70% of the surface of the web guide roller.

6. A member according to claim 2, characterised in that the depth of the troughs or compression chambers is from 30 to 80 μm.

* * * * *